(12) United States Patent
Sommerfeld et al.

(10) Patent No.: US 6,601,271 B1
(45) Date of Patent: Aug. 5, 2003

(54) SYSTEM FOR MOUNTING A WHEEL ON A BED

(75) Inventors: Dean R. Sommerfeld, Iola, WI (US); Scott G. Williamson, Stevens Point, WI (US)

(73) Assignee: Sunrise Medical HHG Inc., Longmont, CO (US)

( * ) Notice: Subject to any disclaimer, the term of this patent is extended or adjusted under 35 U.S.C. 154(b) by 103 days.

(21) Appl. No.: 09/661,866

(22) Filed: Sep. 14, 2000

Related U.S. Application Data

(60) Provisional application No. 60/153,886, filed on Sep. 14, 1999.

(51) Int. Cl.$^7$ ............................................. A45C 9/00
(52) U.S. Cl. ............................... 16/427; 16/2.2; 16/2.3
(58) Field of Search ..................... 16/427, 2.2, 2.3; 384/24, 25, 44, 266, 263, 268, 270, 272, 273; 280/86.756; 301/5.7

(56) References Cited

U.S. PATENT DOCUMENTS

| | | | | |
|---|---|---|---|---|
| 3,164,054 A | * | 1/1965 | Biesecker | 24/662 |
| 3,288,407 A | * | 11/1966 | Downer et al. | 248/56 |
| 3,746,415 A | * | 7/1973 | Thomson | |
| 4,251,122 A | * | 2/1981 | McCloskey | |
| 5,069,586 A | * | 12/1991 | Casey | 411/339 |
| 5,080,852 A | * | 1/1992 | Hertel et al. | 264/269 |
| 5,107,569 A | * | 4/1992 | Hughes | 16/2.1 |
| D341,145 S | * | 11/1993 | Esworthy | |
| 5,297,445 A | * | 3/1994 | Chen | |
| 5,398,618 A | * | 3/1995 | McMullen | |
| 5,651,754 A | * | 7/1997 | Chen | |
| 5,860,895 A | * | 1/1999 | Lee | |
| 5,904,436 A | * | 5/1999 | Maughan et al. | |
| 6,106,441 A | * | 8/2000 | Chen | |

* cited by examiner

*Primary Examiner*—Gary Estremsky
*Assistant Examiner*—Mark Williams
(74) *Attorney, Agent, or Firm*—MacMillan, Sobanski & Todd, LLC

(57) ABSTRACT

A wheel mounting system is comprised of a bearing that is adapted to be positioned between a wheel and the foot tube of a bed. The bearing is comprised of two halve split bearings that are adapted to be fit together to make the complete bearing. The split bearings are adapted to be forced into the wheel and held onto the foot tube by the wheel. A method for mounting a wheel to the foot tube of a bed is comprised of the step of positioning split bearings on the end of a foot tube of the bed with a rib on an interior surface of the split bearings in alignment with an annular groove in the end of the foot tube. The foot tube is then held in a fixture with a backup surface of the fixture abutting the flange of two split bearings. Next, a wheel is forced onto the split bearings while holding the split bearings in place axially with respect to the foot tube by the backup surface, thereby protecting the integrity of the split bearings and assuring that the rib on the interior of the split bearings is maintained in alignment with the annular groove in the end of the foot tube.

12 Claims, 5 Drawing Sheets

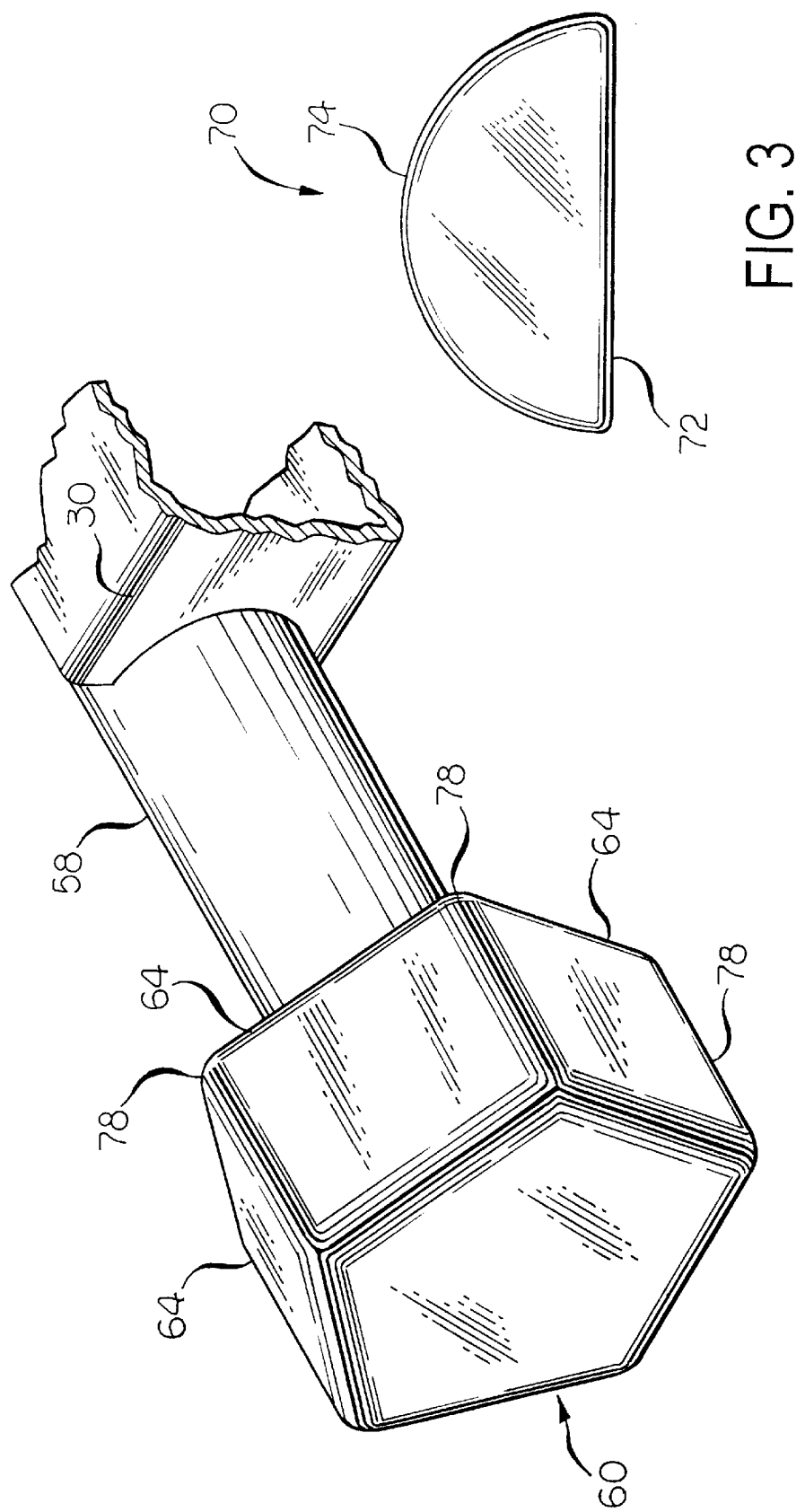

SYSTEM FOR MOUNTING A WHEEL ON A BED

CROSS-REFERENCE TO RELATED APPLICATIONS

This application claims the benefit of U.S. Provisional Patent Application No. 60/153,886, filed on Sep. 14, 1999.

BACKGROUND OF THE INVENTION

This invention relates in general to beds and in particular, to beds of the type having wheels so that the bed can be moved from one location to another. Most particularly, the invention relates to a system for mounting a wheel on a bed and a bed with the same.

Articulated beds are well known. Such beds are generally comprised of a sleep surface supported by a main frame. A pair of opposing legs, in turn, supports the main frame. The legs articulate to change the orientation of the main frame. Articulation of the legs is accommodated by wheels attached to the legs. As the legs articulate, the wheels traverse the surface supporting the wheels.

By convention, wheels are mounted on the bed with axle plates or axle bearings. Plates are typically mounted to the main frame. Bearings may be mounted to or pressed in the main frame. The plates and bearings are adapted to support axles, which in turn support the wheels. Fasteners are often required for mounting the plates and bearings to the main frame, securing the axles to the plates or bearings, and securing the axles to the hubs of the wheels. Mounting the wheels to the main frame may be a costly and cumbersome task and normal wear sustained by the axle or wheel hub often results in undesirable travel of the wheel. This undesirable travel results in canting or play of the wheel. What is needed is a wheel mounting system that is less costly and easier to apply.

SUMMARY OF THE INVENTION

The present invention is directed towards a wheel mounting system on a bed that is simple and inexpensive to tool and easy to apply. The wheel mounting system is comprised of a bearing that is adapted to be positioned between a wheel and the foot tube of a bed. The bearing is comprised of two half split bearings that are adapted to fit together to make the complete bearing. The split bearings are adapted to be forced into the wheel and held onto the foot tube by the wheel.

The invention is also directed towards a method for mounting a wheel to the foot tube of a bed. The method is comprised of the step of positioning split bearings on the end of a foot tube of the bed with a rib on an interior surface of the split bearings in alignment with an annular groove in the end of the foot tube. The foot tube is then held in a fixture with a backup surface of the fixture abutting the flange of two split bearings. Next, a wheel is forced onto the split bearings while holding the split bearings in place axially with respect to the foot tube by the backup surface, thereby protecting the integrity of the split bearings and assuring that the rib on the interior of the split bearings is maintained in alignment with the annular groove in the end of the foot tube.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a schematic view in perspective of one of the flat wheels and the foot tube of the high/low leg of the bed of FIG. 1.

FIG. 3 is a schematic view in elevation of an alternate flat wheel according to the present invention.

DETAILED DESCRIPTION OF THE PREFERRED EMBODIMENT

Figure 1:
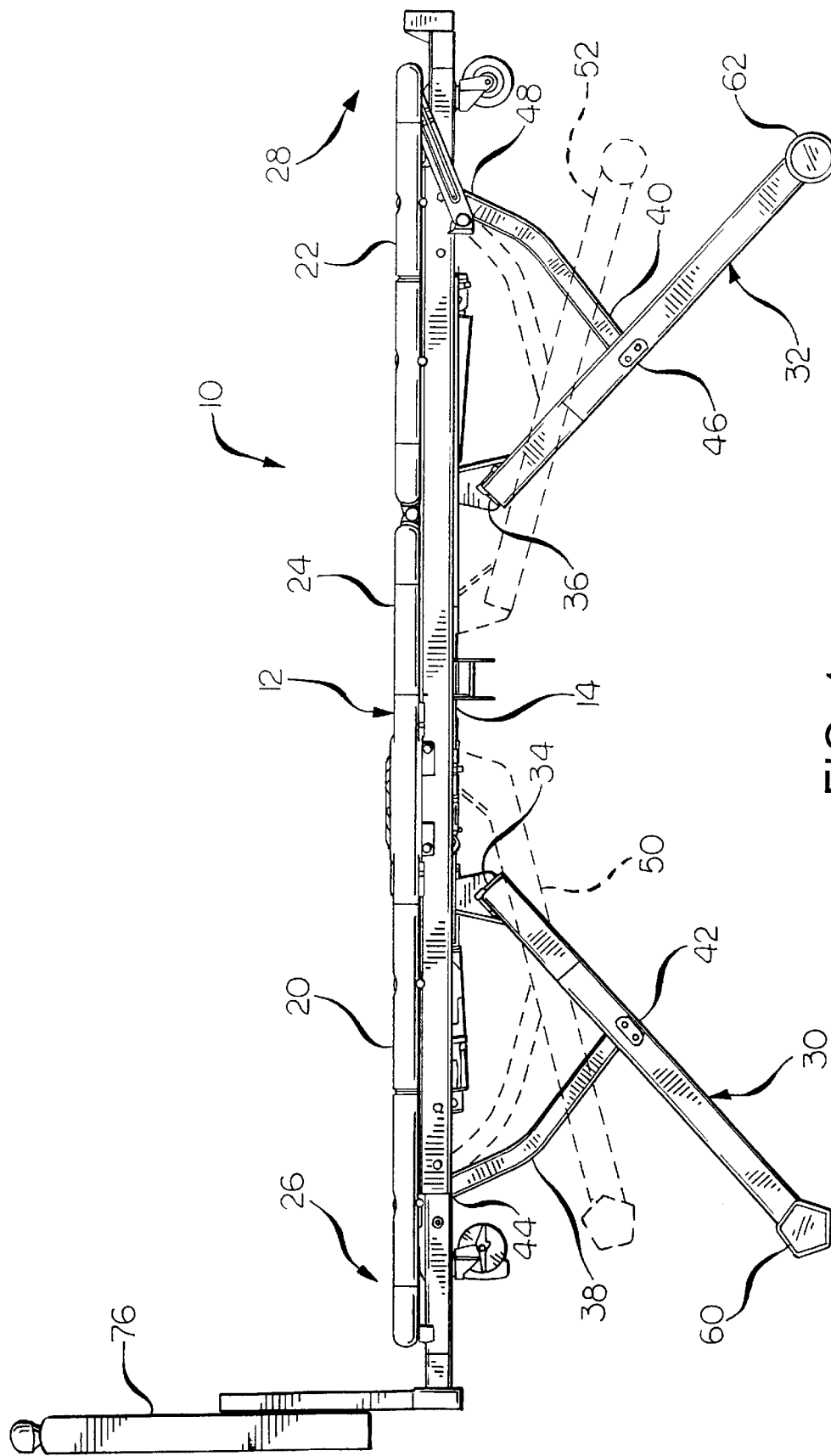
FIG. 1 is a schematic view in elevation of an articulating bed that can be changed in elevation, the bed being provided with flat wheels according to the present invention.

Referring now to the drawings, there is illustrated in FIG. 1 a bed 10 including a sleep surface 12 supported by a main frame 14. The main frame 14 is supported by a pair of opposing legs and corresponding stabilizers, as will be disclosed in greater detail below. The sleep surface 12 preferably includes at least three sections, namely, a head or back section 20, a leg or foot section 22, and a knee section 24 disposed between the head and foot sections 20, 22. The main frame 14 is located below the sleep surface 12 to provide subjacent support for the sleep surface 12. The front legs 30 and rear legs 32 are located below the main frame 14 to provide subjacent support for the main frame 14.

The head and knee sections 20, 24 are preferably pivotally attached to the main frame 14 so as to be movable relative to the main frame 14, in a manner well known in the art. The foot section 22 is pivotally attached to the knee section 24 to move in response to movement of the knee section 24. The legs 30, 32 and corresponding front stabilizers 38 and rear stabilizers 40 are likewise pivotally attached to the main frame 14 to move relative to the main frame 14.

The head and knee sections 20, 24 are movable between a lowered position and a raised, inclined position. This permits the orientation of a bed occupant's head or back and upper legs or knees to be varied relative to the main frame 14. The foot section 22 is movable relative to the main frame 14 and the knee section 24 in response to movement of the knee section 24. This allows the orientation of the bed occupant's lower legs and feet to be varied relative to the main frame 14.

The legs 30, 32 and corresponding stabilizers 38, 40 and the main frame 14 are all movable relative to one another to permit the orientation of the main frame 14 to be varied relative to a support surface, such as a floor. For example, the entire main frame 14 may be lowered or raised relative to the supporting surface by raising and lowering both the head end 26 of the bed 10, and the foot end 28 of the bed 10. Alternatively, either the head end 26 or the foot end 28 of the bed 10 may be lowered or raised to orient the main frame 14 at an angle relative to the supporting surface.

The raising and lowering of the ends 26, 28 of the bed 10 are accomplished by the articulation of head end 26 or front legs 30 and foot end 28 or rear legs 32. The legs 30, 32 are pivotally mounted with respect to the main frame 14 at pivot points 34, 36, respectively. Pivot points 34, 36 are movable longitudinally, forward and rearward, to effect articulation of the legs 30, 32 for raising and lowering the bed 10. For greater stability, the front legs 30 preferably include left and right legs joined together in a U-shaped bent leg tube configuration, and likewise the rear legs 32 preferably include left and right legs joined together in a U-shaped bent leg tube configuration. The control of the articulation of the legs 30, 32 is effected by front stabilizer legs 38 and rear stabilizer legs 40. The front stabilizer legs 38 are pivotally connected to a pivot point 42 on the front legs 30, and also pivotally mounted at a pivot point 44 on the main frame 14. Likewise, the rear stabilizer legs 40 are pivotally connected to a pivot point 46 on the rear legs 32, and also pivotally mounted at a pivot point 48 on the main frame 14.

As disclosed above, pivot points 34, 36 are movable longitudinally, forward and rearward, to effect articulation of the legs 30, 32 for raising and lowering the bed 10. This longitudinal movement of the pivot points 34, 36 can be accomplished by any means, such as by linear actuators and motors, not shown. It can be seen that forward movement of the front pivot point 34 shortens the distance between the movable pivot point 34 and the stationary pivot point 44. This has the effect of articulating the front legs 30, extending the lower portion of the leg in a downward direction. (In actuality, the articulation of the leg 30 does not lower the bed 10, but rather raises the bed 10 since the leg 30 is resting on the ground or support surface.) The front legs 30 are shown in an extended position in solid lines in FIG. 1. In contrast, rearward movement of the front pivot point 34 retracts the front legs 30, bringing it into a retracted position, indicated at 50 in phantom lines in FIG. 1. This has the effect of lowering the bed 10.

The rear legs 32 are configured to articulate in a manner similar to that of the front legs 30. Rearward movement of the rear pivot point 36 shortens the distance between the movable rear pivot point 36 and the stationary rear pivot point 48. This has the effect of articulating the rear legs 32, extending it in a downward direction. The rear legs 32 are shown in an extended position in solid lines in FIG. 1. In contrast, forward movement of the rear pivot point 36 retracts the rear legs 32, bringing it into a retracted position, indicated at 52 in phantom lines in FIG. 1. When the front legs 30 and rear legs 32 are in the retracted position, the main frame 14 and sleep surface 12 will be lower with respect to the supporting surface, i.e., the floor. In this respect, the articulating bed 10 is a high/low bed.

Mounted at the lower end of the two front legs 30 is a foot tube 58, as shown in FIG. 2. Preferably, the two front legs 30 are in a U-shaped configuration, and the foot tube 58 is joined to the lower ends of each of the legs 30 to close the U-shaped configuration. The foot tube 58 is provided with two wheels 60 that are mounted for rotation on the ends of the foot tube 58. It is to be understood that several different mounting configurations for the wheels 60 could be used with the invention, all of which would involve directly or indirectly mounting the wheels 60 at the lower end of the legs 30. The wheels 60 enable the bed 10 to be moved from one place to another as desired. The wheels 60 can be rotatably mounted in any suitable manner, although a preferred structure uses injection molded hubs or bearings that are inserted on the laterally outboard ends of the rear foot tube and that act as a rotatable hub or bearing for the wheel.

At the rear end 28 of the bed 10, the rear foot tube, not shown, is provided with wheels 62. Depending on the configuration of the legs 30, 32, the configuration of the stabilizer legs 38, 40, and the position of the various pivot points 34, 36, 42, 44, 46 and 48, the distance between the front wheels 60 and the rear wheels 62 may vary during articulation. By providing the legs 30, 32 with wheels, the change in distance between the front wheels 60 and the rear wheels 62 can be accommodated. Also, the wheels 60, 62 enable the bed 10 to be moved as desired, such as by moving the bed 10 a short distance for cleaning the room in which the bed 10 is positioned.

Even though there are advantages in providing wheels 60, 62 which allow the bed 10 to be moved, most of the time it is desired that the bed 10 remain stationary. A stationary bed 10 allows more stable access and egress to and from the bed 10. Also, a stationary bed 10 is more easily accessed by caregivers attending to those occupying the bed 10. For this reason, the wheels 60, 62 are mounted so that they do not easily turn, but rather require substantial force for rotation. The need to keep the bed 10 from rolling when it should be kept stationary can be accommodated in part by mounting the wheels 60, 62 in such a manner that there is a substantial amount of friction to inhibit their rolling. In order to increase the resistance to rolling, the front wheels 60 are provided with at least one outside surface that is generally not curved or rounded so that the wheels 60 are inhibited from turning or rolling on the support surface. As shown in FIGS. 1 and 2, the front wheels 60 have the cross-sectional shape of a pentagon, with five generally uniform flat surfaces 64. The flat surfaces 64 enable the bed 10 to be moved short distances, but also substantially inhibit movement of the bed 10 to prevent undue movement of the bed 10. Since the front wheels 60 are pentagonal and therefore rotate only with significant force, when the high/low articulation of the bed 10 causes the distance between the front wheels 60 and the rear wheels 62 to change, all of the movement is accommodated by rotation of the rear wheels 62, and not by the front wheels 60. It can be seen that the flat surfaces of the front wheels 62 allow the bed 10 to be moved short distances without allowing the bed 10 to roll about indiscriminately.

Although a pentagon-shaped wheel is shown, it is to be understood that other shapes having at least one flat surface can be used. Numerous regular geometric shapes, such as hexagons, heptagons and octagons, can be used with the invention. It can be appreciated that a wheel having fewer flat surfaces, such as a square or a pentagon, would be more difficult to rotate on the supporting surface than a wheel having a greater number of flat surfaces, such as a hexagon or a heptagon.

A portion of the wheel may be provided with a curved or round outer surface, like a conventional wheel, and another portion of the wheel may be provided with a flat surface. Such a wheel is indicated at 70 in FIG. 3, where the wheel has one flat surface 72 and a curved surface 74.

The purpose of the flat surface or surfaces is to resist movement. It is not desirable that the flat surface of the front wheels 60 prohibit movement entirely but in many cases it is desirable that the front wheels 60 inhibit inadvertent movement resultant from articulation of the bed 10. In other words, the front wheels 60 should prevent movement of the bed 10 as the main frame 14 is being raised and lowered, and at the same time the front wheels 60 should permit the bed 10 to be moved with the certain amount of force, such as by a custodian needing to clean beneath the bed 10.

The number of flat surfaces may be dependent upon the physical characteristics of the support surface that supports the bed 10. For example, a smooth surface without covering, such as carpet, may offer a minimal level of frictional contact with the wheels 60, 62. Hence, a corner, such as the corners 78 shown in FIG. 2, formed between two adjacent flat surfaces 64 would make little or no frictional contact with a relatively smooth supporting surface. Hence, the front wheels 60 could not be easily turned or rotated to traverse the corner between adjacent flat surfaces. Turning would be facilitated if the floor were covered with a more frictional surface, such as carpeting. Turning could also be facilitated by rounding the corners 78 on the front wheels 60. Turning could also be facilitated by providing a greater number of flat surfaces, such as the eight surfaces in a regular octagon, about the front wheels 60. A greater number of flat surfaces about the front wheels 60 would permit the front wheels 60 to rotate easier on the supporting surface. If the surfaces possessed equivalent surface areas to form, for example, a nonagon, or a decagon, the front wheels 60 would rotate more smoothly. It should be apparent that a wheel with a greater number of flat surfaces would rotate more smoothly than a wheel with fewer flat surfaces.

A possible disadvantage of a wheel having a greater number of flat surfaces is that the wheel may have a greater inclination to rotate on a covered surface. Obviously, a flat surface having a nominal surface area may have little inclination to rotate on a smooth supporting surface because of the low frictional contact with the wheel, especially with the corners between adjacent flat surfaces. However, the same wheel may have a greater inclination to rotate on a covered supporting surface if the frictional contact between the wheel and the supporting surface is increased because of the covering. For example, greater frictional contact may exist between the wheel and a carpeted supporting surface. A flat surface having a relatively small surface area may easily rotate on the covered supporting surface. In addition, the wheel may sink in to some degree in the covered surface to increase the frictional contact with the corner between two adjacent flat surfaces. This would enable the wheel to rotate with relative ease while traversing the corner between two adjacent flat surfaces.

Other factors may affect the rotation of the wheel. For example, weight distribution of the bed 10 and the bed occupant may affect the rotation of the bed 10 independent of the character of the supporting surface. If the force upon the wheel resultant from the mass of the bed 10 or the bed occupant acting upon the wheel is significantly great, then the wheel may have little inclination to rotate.

An important feature of the invention then is to provide a selection of wheels that have one or more flat surfaces. The number of flat surfaces can be dependent on the weight distribution of the bed 10 and the bed occupant. One of the advantages of the invention is that when the bed 10 is articulated, since the front wheels 60 are flat wheels, the head end 26 of the bed 10 will remain relatively stationary. In particular, when the headboard 76 is positioned adjacent a wall, not shown, the articulated bed 10 will not move the headboard 76 toward the wall or away from the wall.

Figure 8:
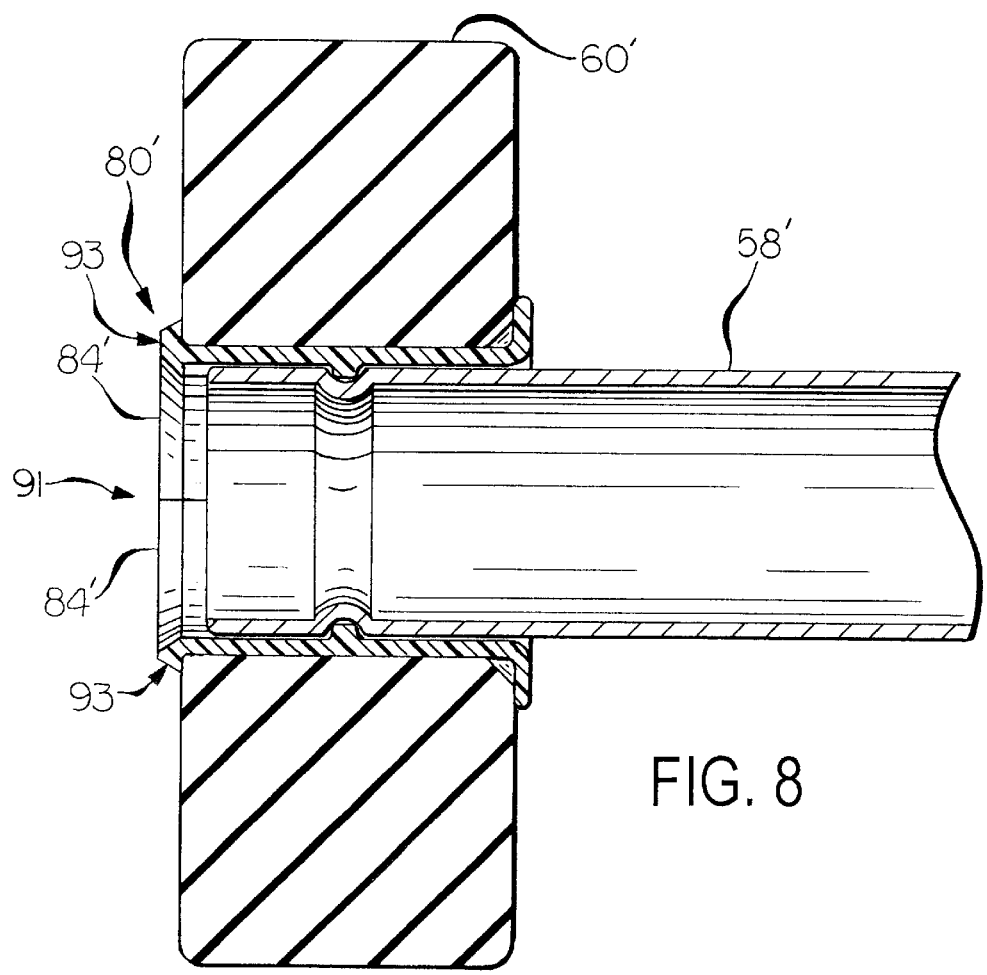
FIG. 8 is a cross-sectional view in elevation of an alternative embodiment of the wheel mounting system of the invention.

The front and rear wheels 60, 62 may be mounted the respective foot tube with the mounting system shown in FIGS. 4–7. To simplify the description, the mounting system will by described with reference to a single wheel 60. The mounting system includes a bearing 80. The bearing 80 is positioned between the wheel 60 and foot tube 58, on the laterally extending end 82 of the foot tube 58. Preferably, the bearing 80 is comprised of two substantially identical half bearings or split bearings 84 that can be fit together to make the complete bearing 80. The split bearings 84 are semicylindrical, and when two of them are put together or fit together, they form the cylindrical, cap-shaped bearing 80. The split bearings 84 are provided with holes 86 and corresponding tabs 88 on the joining edges 90 to properly align the two split bearings 84. As can be seen, the joining edges 90 of each split bearing 84 has three holes 86 and three tabs 88, although any arrangement and number of holes or tabs could be used. It is to be understood that numerous other arrangements could be used to properly align the two split bearing halves 84. For example, the split bearings 84 may be glued together by adhesive. However, the holes 86 and tabs 88 are advantages in that they provide for expedient assembly of the complete bearing 80. As shown, the split bearings 84 are provided with a closed end 92 that protects the wheel 60 and increases the structural integrity of the bearing 80. Moreover, the closed end 92 covers the end 82 of the foot tube 58. This protects the hub of the wheel 60 from the foot tube 58 and prevents debris from collecting in the foot tube 58. The closed end 92 also functions as a hub for wheels that do not have hubs, such as doughnut wheels (as shown in FIG. 8). An alternative embodiment of the bearing 80' could have an open end 91, as shown in FIG. 8. The open end 91 may be provided with a stop 93, such as a rolled inwardly directed flange, to prevent the travel of the split bearings 84' relative to the foot tube 58. The stop 93 may also by provided with an outwardly direct flange that prevents a doughnut wheel 60' from becoming dismounted relative to the bearing 80'.

Referring back to FIGS. 4–7, the end 82 of the foot tube 58 is shown with an annular groove 94 that is designed to mate with or engage an annular rib 96 on the interior surface of the split bearings 84. When the split bearings 84 are properly installed on the end 82 of the foot tube 58, the annular rib 96 will be in alignment with the annular groove 94. The arrangement between the bearing 80 and the foot tube 58 is an interference fit that allows the bearing 80 to rotate with respect to the foot tube 58. The fit between the bearing rib 96 and the groove 94 is designed with a tight tolerance so that canting or play of the wheel 60 is prevented, thereby eliminating wiggling or wobbling of the wheel 60 as a source of undesirable bed unsteadiness. It is to be understood that the groove 94 could be formed in the bearing 80 and the rib 96 could be formed on the foot tube 58.

Figure 4:
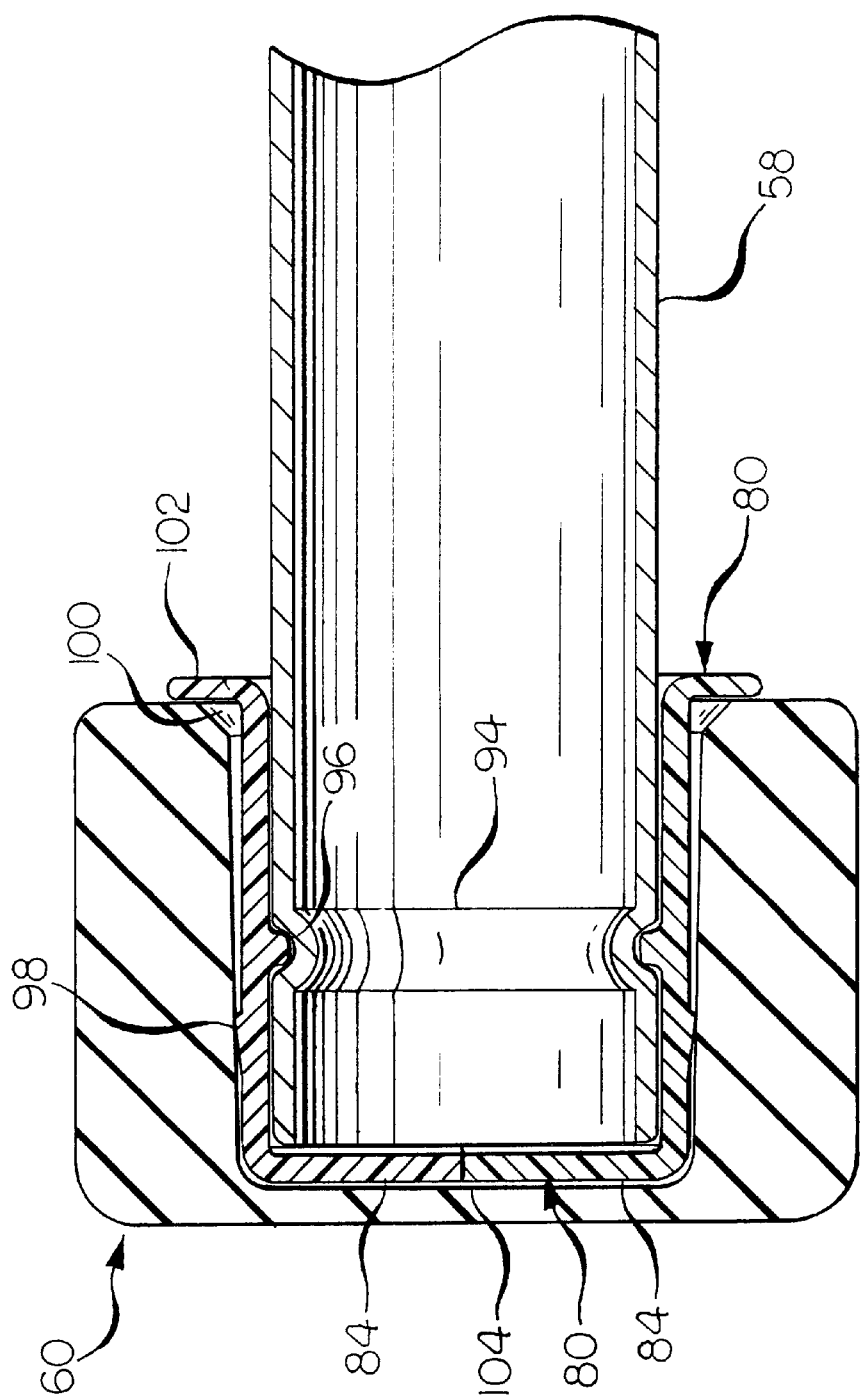
FIG. 4 is a cross-sectional view in elevation of the wheel mounting system of the invention.
Figure 5:
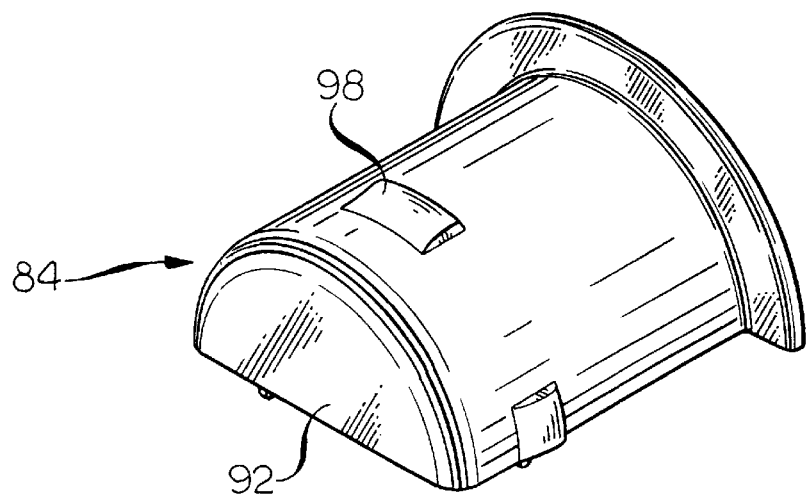
FIGS. 5 and 6 are perspective views of a split bearing, two of which form a bearing to be used in the wheel mounting system of the invention.
Figure 6:
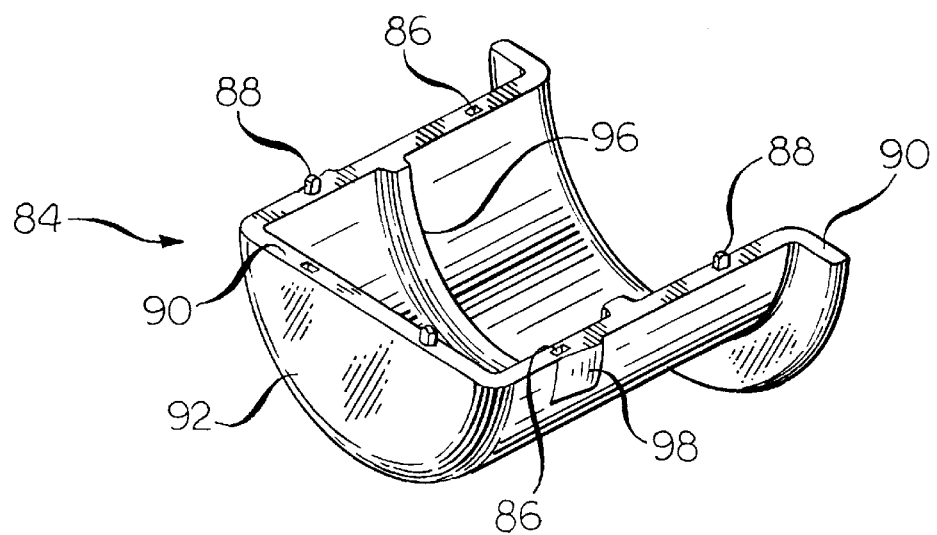
Figure 7:
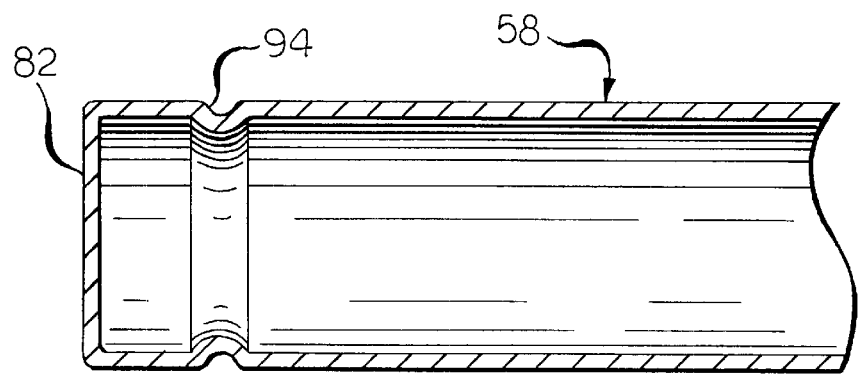
FIG. 7 is a cross-sectional view in elevation of the foot tube of the wheel mounting system of the invention shown in FIG. 4.

The wheel 60 is made of a resilient material, preferably a urethane material, and can be formed in any manner, such as by injection molding. The outside surface of the split bearings 84 is provided with ramped protrusions or teeth 98 that have a sloping surface, sloping downward in the direction of the end 82 of the foot tube 58, i.e., to the left as illustrated in FIG. 4. When the wheel 60 is properly installed on the end 82 of the foot tube 58, the inner surface of the wheel 60 is engaged by the substantially sharp edge of the teeth 98 to prevent the wheel 60 from inadvertently being removed from the foot tube 58. The open end of the wheel 60 is preferably furnished with a beveled or chamfered portion 100 to facilitate the insertion of the bearing 80 and foot tube 58 into the interior of the wheel 60.

The split bearings 84 are furnished with an annular flange 102 forming an outwardly directed lip that is used during assembly of the snap on wheel mounting arrangement of the invention. During assembly, the two split bearings 84 are positioned on the end 82 of the foot tube 58, with the rib 96 in alignment with the annular groove 94. The assembly is preferably performed with the foot tube 58 held in a fixture or jig, not shown. The fixture has a stop or backup surface, also not shown, upon which the flange 102 abuts. Therefore, when the wheel 60 is forced onto the bearing 80, the bearing 80 is held in place axially with respect to the foot tube 58 by the backup surface, thereby protecting the integrity of the bearing 80 and assuring that the rib 96 is maintained in alignment with the annular groove 94. Also, as can be seen in FIG. 4, there is a thin space or cavity 104 between the wheel 60 and the closed end 92 of the bearing 80.

The wheel mounting system of the invention can be used for both the front wheels 60 and the rear wheels 62. Although the wheel mounting system of the invention is shown and described in association with wheels for moving beds, the wheel mounting assembly can also be used for other bed substructures. For example, the wheel mounting assembly of the invention could also be used as a pivot bearing for articulating bed elements, and in the rotatable mounting of caster wheels.

The bearing 80 permits a wheel 60 to be mounted to a foot tube 58 without the use of fasteners. The split bearings 84 are held to the foot tube 58 by mating engagement of annular grooves and ribs 94, 96. The holes 86 and corresponding tabs 88 insure that the split bearings 84 are properly aligned relative to one another. The wheel 60 is held to the split bearings 84 by the teeth 98. The wheel 60 holds the split bearings 84 together. The annular grooves and ribs 94, 96 prevent axial movement of the split bearings 84. The annular flange 102 reduces the risk that the wheel 60 will travel axially relative to the bearing 80. The mounting system is simple and inexpensive to tool and easy to apply.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A mounting system for mounting a wheel to a foot tube of a bed, said mounting system comprising:
    a bearing adapted to be positioned between the wheel and the foot tube, said bearing is comprised of two split bearings that are adapted to be fit together to make the complete bearing, wherein said split bearings have an interior surface and an annular rib on said interior surface, said annular rib being adapted to mate with and engage an annular groove in the end of the foot tube, wherein said split bearings include an outside surface that is provided with ramped teeth that engage an inner surface of the wheel to prevent the wheel from inadvertently being removed from said split bearings.

2. The mounting system according to claim 1, wherein said bearing is mounted on a laterally extending end of the foot tube.

3. The mounting system according to claim 1, wherein said split bearings are substantially identical half bearings.

4. The mounting system according to claim 1, wherein said split bearings are semi-cylindrical bearings that are adapted to fit together to form a cylindrical cap-shaped bearing.

5. The mounting system according to claim 1, wherein said split bearings are provided with joining edges with holes and corresponding tabs on the joining edges to properly align said split bearings.

6. The mounting system according to claim 1, wherein said split bearings are provided with a closed end that protects the wheel and increases the structural integrity of said bearing.

7. The mounting system according to claim 1, wherein an interference fit exists between said bearing and the foot tube.

8. The mounting system according to claim 1, wherein said annular rib and the annular groove are designed within a tight tolerance.

9. The mounting system according to claim 1, wherein said split bearings are adapted to be inserted in a chamfered portion of the wheel.

10. The mounting system according to claim 1, wherein said split bearings are furnished with an annular flange forming an outwardly directed lip that is adapted for use in assembly of a snap-on wheel mounting arrangement.

11. A method of mounting a wheel to a foot tube of a bed, comprising the steps of:
    (a) positioning split bearings on the end of a foot tube of a bed with a rib on an interior surface of the split bearings in alignment with an annular groove in the end of the foot tube;
    (b) holding the foot tube in a fixture with a backup surface of the fixture abutting the flange of two split bearings; and
    (c) forcing a wheel onto the split bearings while holding the split bearings in place axially with respect to the foot tube by the backup surface, thereby protecting the integrity of the split bearings and assuring that the rib on the interior of the split bearings is maintained in alignment with the annular groove in the end of the foot tube.

12. The method according to claim 11, further comprising the step of:
    (d) providing a thin space between the wheel and a closed end of the split bearings.

* * * * *